(12) United States Patent
Matsubara (10) Patent No.: US 6,176,902 B1
(45) Date of Patent: Jan. 23, 2001

(54) ELECTRIC DUST COLLECTOR AND INCINERATOR

(75) Inventor: Makoto Matsubara, Sendai (JP)

(73) Assignee: Galaxy Yugen Kaisha, Maiyagi (JP)

( * ) Notice: Under 35 U.S.C. 154(b), the term of this patent shall be extended for 0 days.

(21) Appl. No.: 09/171,773

(22) PCT Filed: Feb. 27, 1998

(86) PCT No.: PCT/JP98/00846

§ 371 Date: Mar. 12, 1999

§ 102(e) Date: Mar. 12, 1999

(87) PCT Pub. No.: WO98/37973

PCT Pub. Date: Sep. 3, 1998

(30) Foreign Application Priority Data

Feb. 27, 1997 (JP) .................................................. 9-062281

(51) Int. Cl.[7] .................................................... B03C 3/45
(52) U.S. Cl. ..................... 96/66; 96/88; 96/97; 96/98; 110/216
(58) Field of Search .................... 96/59–66, 88, 96/97, 98; 110/216, 345; 95/57, 78

(56) References Cited

U.S. PATENT DOCUMENTS

| | | | | |
|---|---|---|---|---|
| 1,333,790 | * | 3/1920 | Bradley | 96/88 X |
| 3,476,095 | * | 11/1969 | De Laubarede | 96/97 X |
| 4,117,255 | * | 9/1978 | Kawaike et al. | 96/88 X |
| 4,194,888 | * | 3/1980 | Schwab et al. | 96/97 X |
| 4,244,710 | * | 1/1981 | Burger | 96/97 X |
| 4,846,857 | * | 7/1989 | Tachibana | 96/88 X |
| 5,055,115 | * | 10/1991 | Yikai et al. | 96/97 X |
| 5,421,863 | * | 6/1995 | Rector et al. | 96/88 X |
| 5,474,600 | * | 12/1995 | Volodina et al. | 96/59 X |
| 5,484,472 | * | 1/1996 | Weinberg | 96/98 X |
| 5,518,531 | * | 5/1996 | Joannu | 96/97 X |
| 5,538,692 | * | 7/1996 | Joannou | 96/66 X |

FOREIGN PATENT DOCUMENTS 9-047686A  *  2/1997   (JP) .

* cited by examiner

Primary Examiner—Richard L. Chiesa
(74) Attorney, Agent, or Firm—Snider & Associates; Ronald R. Snider (57) ABSTRACT

An electric dust collector that is capable of enhancing collection efficiency. An exhaust pipe (4) consists of a steel pipe (14) whose exterior surface is lined with refractory material (15). A supporting member (5) is supported outside the exhaust pipe (4) and is inserted into the exhaust pipe (4). A discharge electrode (7) is fixed to the supporting member (5) so that it is electrically insulated from the exhaust pipe (4). A surface electrode (6) is fixed to the discharge electrode (7) and has a pyramid-shaped mesh (6c). The mesh (6) is arranged coaxially with the exhaust pipe (4) so that it spreads within the exhaust pipe (4) toward the exit of the exhaust pipe (4). The discharge electrode (7) penetrates the center line of the surface electrode (6) and protrudes downward from the vertex of the mesh (6c). A DC high-tension power supply (8) is electrically connected to the surface electrode (6) and the discharge electrode (7) through the supporting member (5) for applying high DC voltage between the discharge electrode (7) and the pipe (14).

17 Claims, 6 Drawing Sheets

ELECTRIC DUST COLLECTOR AND INCINERATOR

RELATED APPLICATION

This application is a national stage application of PCT/JP98/00846 filed on Feb. 27, 1998, which claims priorty of Japanese Patent Application 9-62281 filed on Feb. 27, 1997.

TECHNICAL FIELD

The present invention relates to an electric dust collector and an incinerator, the electric dust collector having both an exhaust pipe with a metallic pipe whose interior surface lined with refractory matter and a discharge pipe supported within the exhaust pipe.

BACKGROUND ART

A conventional electric dust collector is shown in Japanese Utility Model Publication No. 3021572 by way of example. That is, a metallic beam crosses above the exit of an exhaust pipe, the exhaust pipe having a metallic pipe whose interior surface lined with refractory matter. On approximately the center line of the exhaust pipe, a discharge electrode is hung from the crossbeam into the exhaust pipe so that it is electrically insulated from the exhaust pipe. A high DC voltage is applied between the discharge electrode and the metallic pipe through the crossbeam, whereby dust is collected at a high temperature from exhaust gases passing through the exhaust gases.

Practically the conventional high-temperature type electric dust collector, however, has restrictions on the operating voltage of a high-tension power supply. For this reason, when the diameter of the exhaust pipe is large, the electric field between the exhaust pipe and the discharge electrode cannot be increased to infinity. As a result, there is a possibility that the smoke dust flowing along the central portion of the exhaust pipe will pass through the exit of the exhaust pipe without being guided to the pipe exterior surface of a dust-collecting electrode. For this reason, the conventional high-temperature type electric dust collector lengthens the axial length of the dust collecting section of the exhaust pipe to eliminate the aforementioned disadvantage. However, since the exhaust pipe lengthens, there is a problem that the production cost will increase.

The present invention has been made in view of the aforementioned problems. Accordingly, it is an object of the present invention to provide an electric dust collector and an incinerator that are capable of enhancing collection efficiency without lengthening the dust collecting section of an exhaust pipe.

DISCLOSURE OF THE INVENTION

To achieve the aforementioned object, an electric dust collector according to the present invention comprises: (1) an exhaust pipe with a metallic pipe whose exterior surface is lined with refractory material; (2) an electrode provided to spread within the exhaust pipe, the electrode having a plurality of air holes for disturbing passage of smoke dust charged with electricity to the polarity of the same kind; (3) a supporting member supported outside the exhaust pipe, the electrode being electrically insulated from the exhaust pipe by the supporting member; and (4) a high-tension power supply for applying high DC voltage between the electrode and the metallic pipe, the power supply being provided outside the exhaust pipe and also being electrically connected to the electrode.

The exhaust pipe is circular in cross section, polygonal, or in other shapes. It is preferable that the metallic pipe constituting the exhaust pipe consist of steel. The refractory material covering the interior surface of the metallic pipe may be an insulator at normal temperature. The interior surface of the exhaust pipe does not necessarily have a perfect conducting property like metal at all times. This is because the interior surface will be sufficient if it has a conducting property necessary for neutralizing the electric charge of the smoke dust collected only at a high temperature. It is particularly preferable that the refractory material covering the interior surface of the metallic pipe consist of castable refractory material (refractory concrete with $SiO_2$ and $Al_2O_3$ as main components) and the like. The electrode spreads interiorly of the exhaust pipe and has a three-dimensional shape other than a bar-shaped electrode. The electrode may be either in frame form or in surface form. The electrode may consist of a metal wire, a chain, line material concentrically wound at intervals of a predetermined pitch, line material spirally wound at intervals of a predetermined pitch, a punched metal, an expanded metal or the like, if they have a plurality of air holes for disturbing passage of the smoke dust charged with electricity to the polarity of the same kind. The supporting member may be an insulator, if it is wired interiorly so that it can supply electricity to the electrode.

The first electric dust collector disposes burned exhaust gases with the exhaust pipe. The exhaust pipe is exposed to the high temperature of the exhaust gases; however, since the interior surface has been covered with refractory material, the exhaust pipe can prevent degradation due to a high temperature. Between the electrode and the metallic pipe, a high DC voltage is supplied by a high-tension power supply. For polarities, it is preferable that as in electric dust collectors for general industry, the exhaust pipe be positive and the electrode negative.

The interior surface of the exhaust pipe consists of refractory material, so it has an insulating property at normal temperature and rarely conducts electricity. However, if the internal surface reaches a high temperature of 400° C. or more, it will lose the insulating property and conduct electricity. When the exhaust pipe passes burned exhaust gases therethrough, the interior surface reaches 400° C. or higher and usually reaches a high temperature of 800° C. or so, so that the exhaust pipe becomes a dust-collecting electrode. Since a great number of thermions are present, active corona discharge takes place between the electrode and the exhaust pipe. Due to corona discharge, the smoke dust in the exhaust gases passing through the exhaust pipe is negatively charged with electricity and adheres and condenses on the interior surface of the exhaust pipe. In this manner, smoke dust is removed from exhaust gases, which are in turn discharged from the exit of the exhaust gas.

Incidentally, in the case where the electric field in the interior of the exhaust pipe is weak, even if a bar-shaped electrode were coaxially provided within the exhaust pipe, there will be a possibility that the smoke dust flowing through the exhaust pipe will not be driven to the interior surface of the exhaust pipe. However, an electrode is provided to spread within the exhaust pipe and the distance between the interior surface of the exhaust pipe and the electrode is shortened, whereby the strength of the electric field therebetween is increased. The electrode has air holes. The exhaust gases passing through the air holes are allowed to pass, while passage of the smoke dust charged with electricity to the polarity of the same kind is inhibited. Because of corona discharge, the smoke dust charged with electricity to the polarity of the same kind is guided to the direction of the exhaust pipe along the electrode and adheres and condenses to the interior surface of the exhaust pipe. Thus, even when the electric field in the interior of the exhaust pipe is weak, collection efficiency is enhanced, whereby the smoke dust in exhaust gases can be removed.

A second electric dust collector is characterized in that in the first electric dust collector, the electrode comprises a discharge electrode and a surface electrode. The discharge electrode is arranged substantially coaxially with the exhaust pipe, and the surface electrode has the air holes, is also connected to the discharge electrode protruding downward, and furthermore spreads toward a wall surface of the exhaust pipe.

It is preferable that the discharge electrode be supported to be electrically isolated from the exhaust pipe by a supporting member. It is also preferable that the discharge electrode be provided with a great number of discharge needles radially. Provision of the discharge needles renders it possible for corona discharge to occur easily, even if the discharge gap between the exhaust pipe and the discharge electrode is long. When the discharge electrode is provided with discharge needles, the number and mounted shapes of the discharge needles can be selected in various methods. The supporting member may consist of metal. The surface electrode may be singular or plural in number. In the case where the surface electrode consists of a plurality of electrodes, it is preferable that a plurality of surface electrodes be provided in series along the longitudinal direction of the discharge electrode.

In the second electric dust collector, both the discharge electrode and the surface electrode drive the smoke dust, which flows through the exhaust pipe, to the side surface of the exhaust pipe. In the case where the electric field in the interior of the exhaust pipe is weak, there is a possibility that the discharge electrode alone will not drive the smoke dust, which flows through the exhaust pipe, to the interior surface of the exhaust pipe. However, the surface electrode is provided on the exit side beyond the discharge electrode of the exhaust pipe, and the distance between the interior surface of the exhaust pipe and the electrode is gradually reduced toward the exit, so that the intensity of the electric field therebetween is increased. The surface electrode has air holes, and it allows clean exhaust gases to pass therethrough but prevents the smoke dust charged with electricity to the polarity of the same kind from passing therethrough. For this reason, the smoke dust, charged with electricity to the polarity of the same kind by corona discharge, is guided in the direction of the exhaust pipe along the electrode and adheres and condenses to the interior surface of the exhaust pipe. Thus, even in the case where the electric field in the interior of the exhaust pipe is weak, collection efficiency is enhanced and the smoke dust in exhaust gases can be removed.

A third electric dust collector is characterized in that in the second electric dust collector, the surface electrode has a mesh. The mesh has the air holes and is arranged to disturb a flow passage while keeping spacing between the wall surface of the exhaust pipe and an exterior circumference of the surface electrode.

The mesh may be in the form of an inclined plane, a hemisphere, a spiral, a pleat, a combination of a conical surface and a cylindrical surface, a spherical shell, and other configurations.

In the third electric dust collector, the mesh of the surface electrode is provided on the exit side beyond the discharge electrode of the exhaust pipe. The distance between the interior surface of the exhaust pipe and the electrode is gradually reduced toward the exit along the inclined surface of the mesh, and the intensity of the electric field therebetween is gradually increased. Because of operation of a high electric field, the mesh allows clean exhaust gases to pass therethrough without significantly disturbing the passage of the exhaust gases, while it prevents the smoke dust charged with electricity to the polarity of the same kind from passing therethrough. For this reason, the smoke dust, charged with electricity to the polarity of the same kind by corona discharge, is reliably guided in the direction of the exhaust pipe along the inclined surface of the mesh and then adheres and condenses to the interior surface of the exhaust pipe. Thus, even in the case where the electric field in the interior of the exhaust pipe is weak, collection efficiency is enhanced and the smoke dust in exhaust gases can be removed.

A fourth electric dust collector is characterized in that in the third electric dust collector, the surface frame has a ring frame and connecting frames. The ring frame has substantially the same contour as the sectional configuration of the exhaust pipe, is also connected to the discharge electrode by the connecting frames, and is arranged substantially coaxially with the exhaust pipe and equidistantly from the wall surface. The mesh makes contact with the ring frame, and the discharge electrode is supported by the supporting member.

In the fourth electric dust collector, the surface electrode has a ring frame and connecting frames, whereby the structure thereof is enhanced. The ring frame is located equidistantly from the wall surface of the exhaust pipe. The mesh makes contact with the ring frame and prevents the smoke dust charged with electricity to the polarity of the same kind from passing therethrough. For this reason, the smoke dust, charged with electricity to the polarity of the same kind by corona discharge, is guided in the direction of the exhaust pipe along the mesh and adheres and condenses to the interior surface of the exhaust pipe.

Thus, even in the case where the electric field in the interior of the exhaust pipe is weak, collection efficiency is enhanced and the smoke dust in exhaust gases can be removed.

A fifth electric dust collector is characterized in that in the fourth electric dust collector, the exhaust pipe has a polygonal sectional shape, the mesh has a pyramid shape spreading toward an exit of the exhaust pipe, and also the discharge electrode protrudes downward from the vertex of the pyramid shape.

A sixth electric dust collector is characterized in that in the fourth electric dust collector, the exhaust pipe has a circular sectional shape, the mesh has a conical shape spreading toward an exit of the exhaust pipe, and also the discharge electrode protrudes downward from the vertex of the conical shape.

The sectional configuration of the exhaust pipe may be triangular, square, pentagonal, any other polygonal or circular. The mesh has the same sectional configuration as the exhaust pipe. When the sectional configuration of the exhaust pipe is circular, the mesh has a conical configuration. When the sectional configuration of the exhaust pipe is square, the mesh has a quadrangular pyramid configuration. When the sectional configuration of the exhaust pipe is pentagonal, the mesh has a pentagonal pyramid configuration. The ring frame has the same contour as the sectional configuration of the exhaust pipe; however, since the distance between the interior surface of the exhaust pipe and the mesh becomes shortest, it is preferable that the ring frame consist of a large-diameter round pipe or a large square pipe and that the entire shape be rounded without corners, in order to prevent corona discharge.

In the fifth or the sixth electric dust collector, in the case where the electric field in the interior of the exhaust pipe is weak, there is a possibility that the discharge electrode alone will not drive the smoke dust, which flows through the exhaust pipe, to the interior surface of the exhaust pipe. However, the electrode with a mesh having a pyramid surface configuration or a conical surface configuration is provided on the exit side beyond the discharge electrode of the exhaust pipe, and the distance between the interior surface of the exhaust pipe and the electrode is gradually reduced toward the exit. Therefore, the intensity of the electric field therebetween is increased. The mesh prevents the smoke dust charged with electricity to the polarity of the same kind from passing therethrough. For this reason, the smoke dust, charged with electricity to the polarity of the same kind by corona discharge, is reliably guided in the direction of the interior surface of the exhaust pipe along the mesh in the form of a pyramid or a cone. Then, the smoke dust adheres and condenses to the interior surface of the exhaust pipe. Thus, even in the case where the electric field in the interior of the exhaust pipe is weak, collection efficiency is enhanced and the smoke dust in exhaust gases can be removed. It is preferable that the area of the pyramid or conical surface be large for prevention of the rise in the pressure loss of the flow passage.

A seventh electric dust collector is characterized in that in the fifth or the sixth electric dust collector, it further comprises an air blower. The exhaust pipe has a through hole. The supporting member is electrically insulated from the exhaust pipe and inserted into the exhaust pipe through the through hole, and the air blower is provided outside the exhaust pipe for sending air into the exhaust pipe through the through hole.

The through hole may be singular or plural; however, it is preferable that two or more through holes be formed in the exhaust pipe from the standpoint of strength. It is also preferable that in order to prevent concentration of an electric field, the margin of the through hole be further covered with refractory insulating material, particularly heat-resisting ceramic material. The gas that is introduced by the air blower will be sufficient if it is the air; however, forcibly cooled air may be sent. It is preferable that the supporting member consist of heat resisting metal and that the discharge electrode be electrically connected to a high-tension power supply through the supporting member. In the case where the supporting member consists of heat resisting material, it is preferable that the supporting member be supported outside the exhaust pipe by insulators provided at positions lower than the through holes. The reason for this is that in addition to avoidance of the heat radiation from the furnace, high-temperature exhaust gases take advantage of their characteristics showing inverse buoyancy (resistance force) with respect to a downward direction and prevent the temperature rise of the insulator or the adhesion of smoke dust which is caused by the back flow of high-temperature exhaust gases. It is also preferable that the ring frame be installed at a position such that the air introduced through the through hole does not affect the ring frame.

In the seventh electric dust collector, by sending air into the exhaust pipe through the through holes, exhaust gases are prevented from leaking from the through holes outside the exhaust pipe. Sending of air into the exhaust pipe through the through holes can prevent the back flow of exhaust gases from occurring through the through holes of the exhaust pipe and also makes it difficult for smoke dust to adhere to the exterior surface of the exhaust pipe.

The supporting member is electrically insulated from the exhaust pipe; however, even in the case where the supporting member consists of metal or insulating material, there is a possibility that corona discharge will take place between the supporting member and the through hole, if the vicinity of the through hole reaches a high temperature. If corona discharge arises between the supporting member and the through hole, then there will be a possibility that it will give rise to spark discharge. Cooling the vicinity of the through hole 16 by sending of air can keep satisfactory insulation between the supporting member and the through hole.

In the case where (1) the measuring hole of the exhaust pipe is provided near the exit of the exhaust pipe and (2) the measuring hole of the exhaust pipe is separated from the supporting member with a high voltage and guarded with a mesh grounded under the measuring hole, the measurement of exhaust gases can be safely performed at the measuring hole.

An incinerator according to the present invention comprises the electric dust collector of one of the first through the seventh electric dust collectors, and a combustion chamber arranged just under the electric dust collector along the longitudinal direction of the exhaust pipe.

In the incinerator according to the present invention, the electric dust collector disposes the exhaust gases, produced by the combustion in the combustion chamber, and discharges the disposed gases, removing the smoke dust in the gases. The present inventor has made various experiments with respect to various kinds of smoke dust and has confirmed that even if smoke dust does not show electric conductive property at normal temperature, it always has conductive property at a high temperature. That is, the current surface on which dust has been deposited becomes a new dust-collecting surface, which in turn accelerates deposition. However, if the smoke dust that adhered and condensed to the interior surface of the exhaust pipe reaches a certain degree of thickness, it will peel off the interior surface of the exhaust pipe naturally by its tare weight and fall down on an incinerator floor just under the pipe. Since the smoke dust that peeled off and fell can be disposed along with the ashes in the incinerator floor, the electric dust collector can omit equipment for receiving smoke dust.

In accordance with the electric dust collector and incinerator of the present invention, an electrode with a plurality of air holes is provided to spread interiorly of the exhaust pipe. Therefore, exhaust gases passes through the air holes, while the smoke dust in the exhaust gases is guided toward the interior surface of the exhaust pipe along the electrode. The guided moke dust adheres to the interior surface of the exhaust pipe, so that the collection efficiency can be enhanced.

Particularly, according to the second electric dust collector, the electrode consists of a discharge electrode and a surface electrode. Therefore, the discharge electrode drives smoke dust to the side surface of the exhaust pipe, while the surface electrode guides exhaust gases in the direction of the exhaust pipe. Thus, the exhaust pipe can enhance its collection efficiency.

Particularly, according to the third electric dust collector, the surface electrode has a mesh with an inclined surface. Therefore, the strength of the electric field gradually increases in the exit direction of the exhaust pipe along the inclined surface of the mesh. As a result, passage of clean exhaust gases is rarely disturbed and smoke dust is reliably guided to the direction of the exhaust pipe along the inclined surface of the mesh. Thus, the exhaust pipe can enhance its collection efficiency.

Particularly, according to the fourth electric dust collector, the surface electrode has a ring frame and connecting frames, so the structure thereof is enhanced.

Particularly, according to the fifth electric dust collector, the exhaust pipe has a polygonal sectional shape, so the exhaust pipe is easy to manufacture, compared with the case of a circular sectional shape. In addition, since the mesh has a pyramid shape, it is easy to guide smoke dust reliably toward the interior surface of the exhaust pipe along the inclined surface of the mesh.

Particularly, according to the sixth electric dust collector, the exhaust pipe has a circular sectional shape and the mesh has a conical shape, it is easy to guide smoke dust reliably toward the interior surface of the exhaust pipe along the inclined surface of the mesh.

Particularly, according to the seventh electric dust collector, the discharge electrode is supported by a supporting member passing through the through holes of the exhaust pipe. Therefore, since the measuring hole of the exhaust pipe can be provided so that it is separated from the discharge electrode, the measurement of exhaust gases can be safely performed. In addition, since the dust collector has an air blower for sending air into the exhaust pipe through the through holes, exhaust gases can be prevented from leaking from the through holes outside the exhaust pipe. Also, corona discharge can be prevented from arising between the supporting member and the through hole. In addition, smoke dust can be prevented from adhering to the through hole. Furthermore, when supporting the supporting member by insulators, damage to the insulators or a reduction in an insulating property can be prevented.

BRIEF DESCRIPTION OF THE DRAWINGS

FIGS. 5(A) to 5(I) are diagrams used to explain different embodiments of the mesh of the electrode;

FIGS. 6(J) to 6O(b) are diagrams used for explaining further different embodiments of the mesh of the electrode;

FIGS. 7(P) to 7(R) are diagrams used for explaining different embodiments of the mesh of the electrode.

BEST MODE FOR CARRYING OUT THE INVENTION

Referring to FIGS. 1 through 7, there is shown an embodiment of the present invention.

Figure 1:
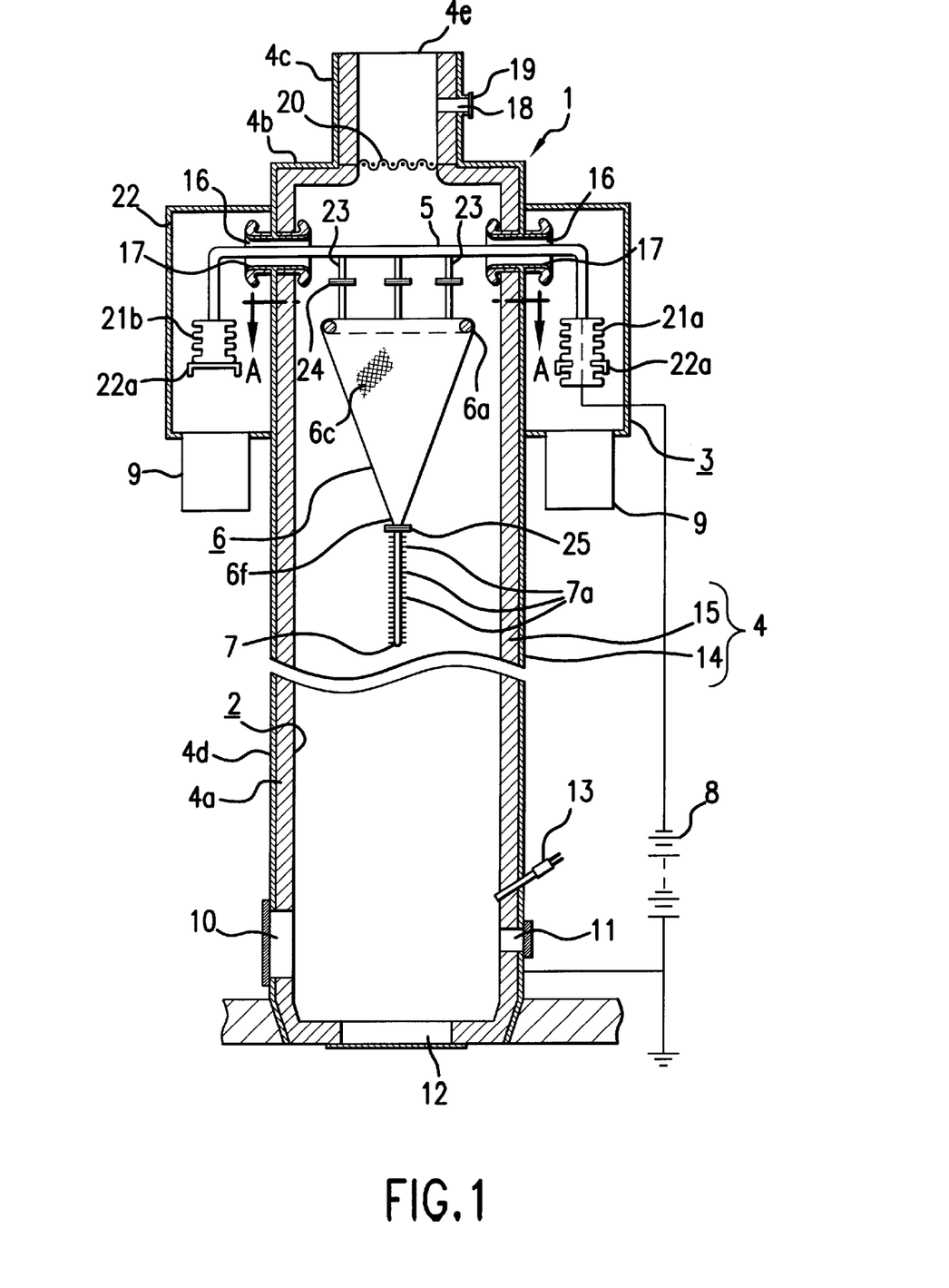
FIG. 1 is a vertical sectional view showing an incinerator according to an embodiment of the present invention.

As illustrated in FIG. 1, an incinerator 1 has a combustion chamber 2 and an electric dust collector 3. The electric dust collector 3 has an exhaust pipe 4, a supporting member 5, a surface electrode 6, a discharge electrode 7, a DC high-tension power supply 8, and an air blower 9. The exhaust pipe 4 extends vertically, and the combustion chamber 2 is provided just under the exhaust pipe 4 in the vertical direction. The combustion chamber 2 is provided in the side wall thereof with a waste inlet port 10 and an air intake port 11. The incinerator 1 is provided on the floor thereof with an ash outlet port 12. The combustion chamber 2 is also provided with a stabilizing burner 13.

Figure 2:
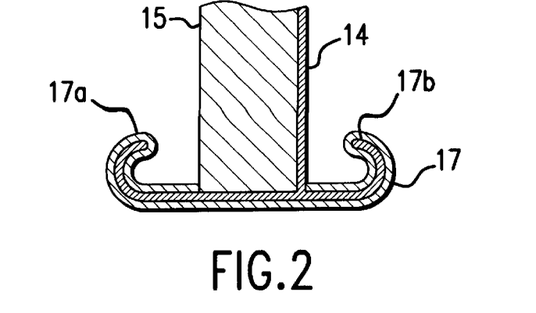
FIG. 2 is an enlarged sectional view showing the vicinity of the through hole of FIG. 1.

The exhaust pipe 4 is rectangular in cross section and consists of a rectangular-parallelepiped steel pipe 14 whose interior surface is lined with castable refractory material 15. With the object of reliably driving the electric charge collected on the refractory material 15 to the steel pipe 14 at a high temperature in addition to the fall prevention of the refractory material 15, a great number of heat-resisting metallic anchors are implanted in the interior surface of the pipe 14. The longitudinal and transverse lengths of the exhaust pipe 4 are, for example, about 6 to 7 meters. The exhaust pipe 4 has two opposed through holes 16 in the side wall 4a thereof. The through hole 16 is located at a position corresponding to a coaxial, cylindrical electrode and constructed as follows. That is, the cross section of the heat-resisting metallic ground material of the through hole 16 consists of a cylinder with the same diameter similar to the Rogowskii electrode and end portions rounded to prevent the concentration of an electric field. The heat-resisting metallic ground material of the through hole 16 is further covered with heat-resisting ceramic 17 for an enhancement in the insulating property and an enhancement in the heat-resisting property. The heat resisting ceramic 17 is also constructed as depicted in FIG. 2 in order to avoid the concentration of an electric field and prevent corona discharge. That is, the cross section is similar to the Rogowskii electrode, and the central portion of the interior surface is parallel and curved at inner and outer end portions 17a and 17b. The inner and outer end portions 17a and 17b each have a rounded, curved surface.

The exhaust pipe 4 has a bent portion 4b above the through holes 16 so that the inside diameter thereof is narrowed. Because of the bent portion 4b, there is an advantage that the temperatures of the combustion chamber 2 and the exhaust pipe 4 are high, stable, and not cooled. In addition, the flow rate of exhaust gases is increased at the upper portion 4c of the exhaust pipe 4 higher than the bent portion 4b and is therefore easy to measure. The bent portion 4b partitions the upper portion 4c and the lower portion 4d. The upper portion 4c of the exhaust pipe 4 is provided with a measuring hole 18. The measuring hole 18 is provided with a closing lid 19. A heat-resisting metallic mesh 20 is attached to the interior surface of the upper portion 4c of the exhaust pipe 4 so as to close the exhaust pipe 4. The mesh 20 penetrates the castable refractory material 15 and is electrically connected to the steel pipe 14. As a result, the mesh 20 reliably prevents an electric shock from the discharge electrode 7 when a measurement is made through the measuring hole 18. The exhaust pipe 4 has an exhaust gas outlet 4e at its upper end.

The supporting member 5 is tubular in shape and consists of a heat-resisting alloy. The supporting member 5 passes through the through holes 16 and is inserted into the exhaust pipe 4. The opposite ends of the supporting member 5 are supported outside the exhaust pipe 4 by insulators 21a and 21b. The supporting member 5 is away from the measuring hole 18 by a sufficient distance so that when a measurement is made through the measuring hole 18, an electric shock does not take place. A duct 22 is provided on the exterior surface of the side wall 4a of the exhaust pipe 4 to surround the through holes 16 and the opposite ends of the supporting member 5. The insulators 21a and 21b are provided at positions lower than the through holes 16 within the duct 22. Electricity is supplied to one of the insulators 21a from the external power supply of the duct 22 through an insulating cable at the through insulator. The supporting member 5 is away from the margin of the through hole 16 by a sufficient distance such that no spark discharge occurs. As a result, the supporting member 5 is electrically insulated from the duct 22 and the exhaust pipe 4.

Figure 3:
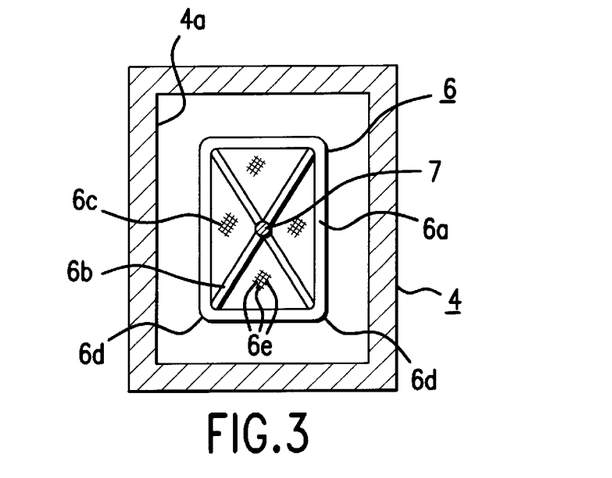
FIG. 3 is a sectional view of the incinerator taken along line A—A of FIG. 1.
Figure 4:
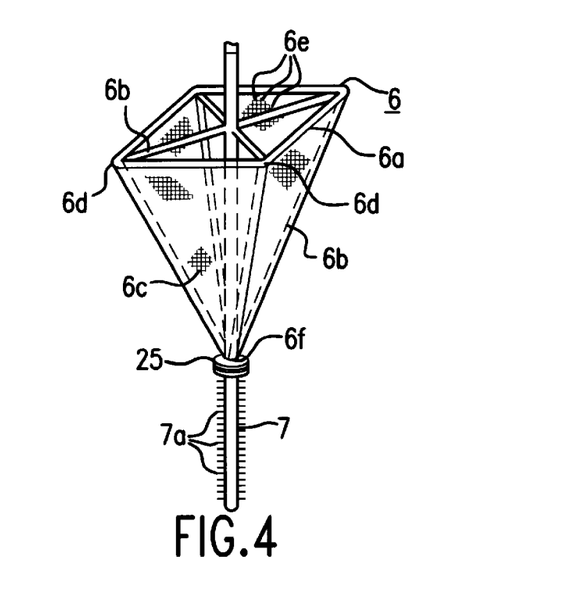
FIG. 4 is a perspective view showing the electrode of the incinerator of FIG. 1.
Figure 5A:
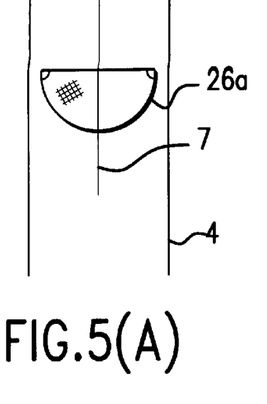
Figure 5B:
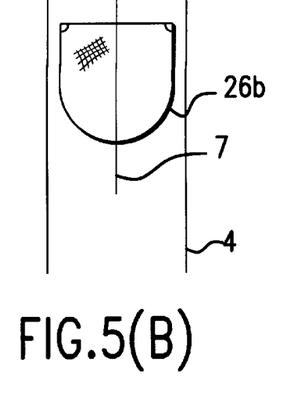
Figure 5C:
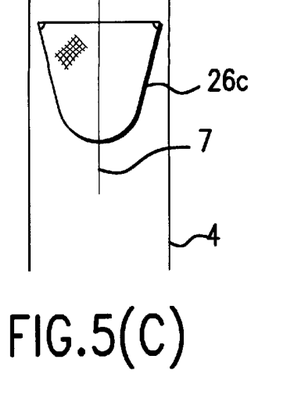
Figure 5D:
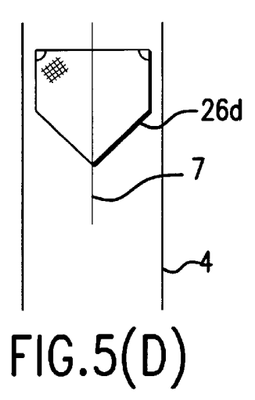
Figure 5E:
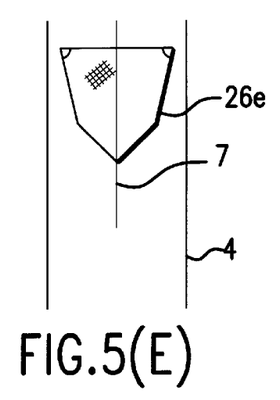
Figure 5F:
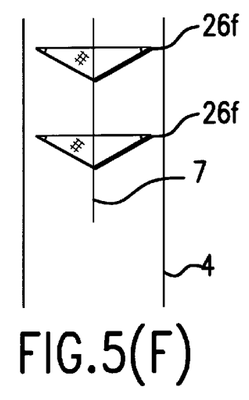
Figure 5G:
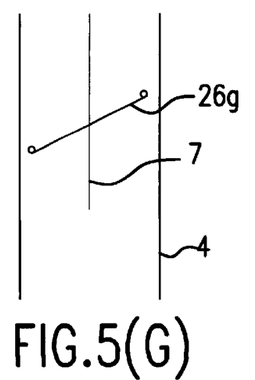
Figure 5H:
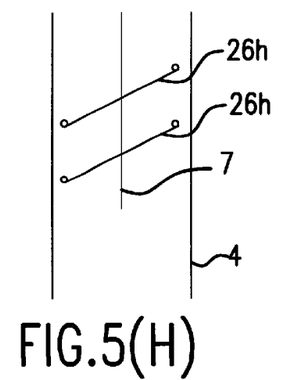
Figure 5I:
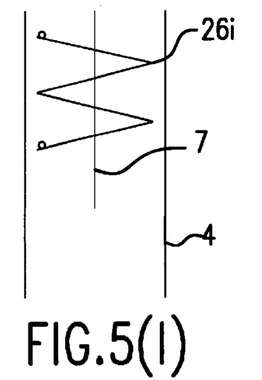

The surface electrode 6 and the discharge electrode 7 constitute electrodes of the same polarity. As illustrated in FIGS. 3 and 4, the surface electrode 6 has a ring frame 6a, connecting frames 6b, and a mesh 6c. The surface electrode 6 is provided to spread within the exhaust pipe 4. The ring frame 6a and the connecting frame 6b each consist of a round pipe. As depicted in FIGS. 3 and 4, the ring frame 6a has substantially the same rectangular contour as the sectional configuration of the exhaust pipe 4, while the corner 6d is considerably rounded. The connecting frames 6b consist of 8 frames. Among them, the four connecting frames 6b are fixed perpendicularly to the discharge electrode 7, extend radially outward, and are respectively fixed to the corners 6d. The remaining four connecting frames 6b are arranged to form the four edges of an inverted quadrangular pyramid, and the respective opposite ends are fixed to the corner 6d of the ring frame 6a and the discharge electrode 7. Thus, the ring frame 6a is fixed to the discharge electrode 7 by the connecting frames 6b and is arranged substantially coaxially with the exhaust pipe 4 and equidistantly from the side wall 4a. The ring frame 6a is further fixed to the supporting member 5 by a plurality of fixing bars 23. The discharge electrode 7 and the fixing bars 23 have flanges 24 between the frames (6a and 6b) and the supporting member 5, and they can be separated from each other by the flanges 24. When the surface electrode 6 or the discharge electrode 7 is repaired, it is separated from the flanges 24 and taken down, whereby the repairs can be readily made.

The mesh 6c consists of a heat-resisting metallic mesh or a heat-resisting silica fiber mesh. The mesh 6c has a large number of air holes 6e. The size of the air hole 6e is selected by the relationship between the flow rate of exhaust gases and generated field strength so that negatively charged smoke dust is prevented from passing therethrough. As illustrated in FIG. 4, the mesh 6c is secured to the ring frame 6a and connecting frames 6b. The mesh 6c has an inverted quadrangular pyramid shape and covers the connecting frames 6d downward from the ring frame 6a. Note that the mesh 6c may be fixed so that it is wound around the ring frame 6a, or fixed by other methods. The mesh 6c is disposed substantially coaxially with the exhaust pipe 4 so as to spread within the exhaust pipe 4 toward the exit 4e with the vertex 6f down. For this reason, the mesh 6c has an inclined surface that spreads toward the side wall 4a of the exhaust pipe 4.

The discharge electrode 7 is tubular in shape, is disposed to be substantially coaxial with the exhaust pipe 4, and extends on approximately the inner center line of the exhaust pipe 4 along the exhaust pipe 4. The discharge electrode 7 penetrates the center line of the surface electrode 6 and is mounted on the supporting member 5, whereby the surface electrode 6 is attached to the supporting member 5. The discharge electrode 7 protrudes downward from the vertex 6f of the mesh 6c in the form of a quadrangular pyramid. As shown in FIG. 4, the vertex 6f is provided with a flange 25 so that the discharge electrode 7 protruding downward from the vertex 6f can be removed therefrom. The discharge electrode 7 is supported so that it is away from the exhaust pipe 4 and electrically insulated from the exhaust pipe 4. The discharge electrode 7 has a great number of radially extending discharge needles 7a.

A direct current (DC) high-tension power supply 8 is provided outside the exhaust pipe 4 and the duct 22. The DC high-tension power supply 8 passes through the through insulator 21a and is electrically connected to the supporting member 5 by an insulating cable. The DC high-tension power supply 8 is also connected electrically to the surface electrode 6 and the discharge electrode 7 through the supporting member 5. The negative electrode of the DC high-tension power supply 8 is connected to the surface electrode 6 and the discharge electrode 7, while the negative electrode is grounded. The steel pipe 14 of the exhaust pipe 4 is grounded. The DC high-tension power supply 8 can apply a high DC voltage between the discharge electrode 7 (and the surface electrode 6) and the pipe 14, by turning on a switch.

The duct 22 is provided with insulator fixing members 22a. The air blower 9 is connected to the duct 22 so that air can be sent into the exhaust tube 4 from the through holes 16 through the duct 22. The airblower 9 rotates its fan with electricity and sends the air at normal temperature. It is preferable that the rise in the pressure loss by the reduction in the flow area of the bent portion 4b be overcome with the ventilation force generated by the height of the upper portion 4c of the exhaust pipe 14. It is also preferable that the rise in the pressure loss by the mesh 20 be overcome with the aforementioned ventilation force. Furthermore, it is preferable that the positions at which the through holes 16 are formed in the exhaust pipe 4 be designed to be down from the bent portion 4b with a sufficient space. In the case where the exhaust pipe 4 is thus designed optimally, the duct 22 may be naturally ventilated with no power, because the pressure in the through hole 16 on the side of the interior of the incinerator 1 is negative except when starting or stopping.

Now, the operation will be described.

When waste matter is burned and disposed with the incinerator 1, the waste matter is thrown from the throw-in port 10 into the combustion chamber 2. The exhaust gases, produced by the burning in the combustion chamber 2, generates natural ventilation force because of the high temperature thereof and rises toward the exit 4e through the exhaust pipe 4 of the electric dust collector 3. The exhaust pipe 4 is filled with the high-temperature exhaust gases. The exhaust pipe 4 is exposed to a high temperature because of the high-temperature exhaust gases and the radiation heat from the burning; however, degradation due to a high temperature can be prevented because the interior surface of the exhaust pipe 4 is covered with the castable refractory material 15.

The high-tension power supply 8 applies a high DC voltage of 75 to 200 kV between the discharge electrode 7 and the steel pipe 14, whereby the exhaust pipe 4 is made positive and the discharge electrode 7 negative. Normally, the interior surface of the exhaust pipe 4 is heated to a high temperature of 700 to 900° C. For this reason, the refractory material 15 becomes conductive and the exhaust pipe 4 becomes a dust-collecting electrode, so that active corona discharge takes place between the discharge electrode 7 and the exhaust pipe 4. Then, smoke dust adheres and condenses to the interior surface of the exhaust pipe 4. Thus, exhaust gases are discharged from the exit 4e of the exhaust pipe 4, while the smoke dust is being removed.

Incidentally, since the diameter of the exhaust pipe 4 is large, the intensity of the electric field that is produced within the exhaust pipe 4 cannot be increased. For this reason, there is a possibility that the discharge electrode 7 alone will not drive the smoke dust, which flows along the central portion of the exhaust pipe 4, to the exhaust pipe 4. In the electric dust collector 3, however, the surface electrode 6 with the mesh 6c in the form of a quadrangular pyramid is provided on the exit side beyond the discharge electrode 7 of the exhaust pipe 4 so as to spread interiorly of the exhaust pipe 4. With this arrangement, the distance between the interior surface of the exhaust pipe 4 and the mesh 6c is gradually reduced toward the exit 4e, so that the intensity of the electric field therebetween is gradually increased.

As previously described, the mesh 6c has a great number of air holes 6e and covers the connecting frames 6b downward from the ring frame 6a. For this reason, the surface electrode 6, while passing exhaust gases through the great number of air holes 6e without significantly disturbing the exhaust gases, prevents negatively charged smoke dust from passing through the inside of the ring frame 6a. The smoke dust negatively charged by the discharge electrode 7 is reliably guided toward the exhaust pipe 4 along the inclined surface of the mesh 6c and is collected by the exhaust pipe 4. As a result, the collected smoke dust adheres and condenses to the interior surface of the exhaust pipe 4. Thus, even if the diameter of the exhaust pipe 4 is large and the electric field within the exhaust pipe 4 is weak, the operation of the surface electrode 6 can enhance collection efficiency and remove the smoke dust in the exhaust gases. Note that the distance between the ring frame 6a of the surface electrode 6 and the interior surface of the exhaust pipe 4 is shortest and therefore the collection of dust is most effectively performed at that place.

The smoke dust adhering to the interior surface of the exhaust pipe 4 is weak in adhesion because it has been exposed to a high temperature. For this reason, if the smoke dust is condensed and deposited to a certain degree of thickness, a certain range of area will peel off the interior surface of the exhaust pipe 4 naturally by its tare weight and fall down on an incinerator floor 12 just under the pipe. Since the smoke dust that peeled off has considerably condensed, re-scattering does not take place during the fall. The smoke dust that peeled off and fell down can be disposed along with the ashes in the incinerator floor 1, so that the electric dust collector 3 can omit equipment for receiving smoke dusk and has become structurally simple.

When the component of the exhaust gases after dust collection, the amount of the smoke dust in the exhaust gases, the flow rate of the exhaust gases or the like is measured, the closing lid 19 of the measuring hole 18 is opened and a measuring instrument is inserted into the exhaust pipe 4, thereby making a measurement. The discharge electrode 7 is supported by the supporting member 5 passing through the through holes 16 of the exhaust pipe 4, the vicinity of the measuring hole 18 is away from the discharge electrode 7, and the mesh 20 is grounded. Therefore, the measurement of the exhaust gases can be safely made.

When incineration and dust disposal are performed, the air blower 9 is operated for sending air into the exhaust pipe 4 through the duct 22 and the through holes 16. The sending of air can prevent exhaust gases from leaking from the through holes 16 outside the exhaust pipe 4 both during ignition-start and during explosion-combustion. If smoke dust adheres to the supporting member 5 and reaches the through hole 16, there will be a possibility of spark discharge. By sending air to the through hole 16 with the air blower 9, it can be made difficult for smoke dust to adhere to the supporting member 5 near the through hole 16 and also spark discharge can be prevented.

Sending of air can also cool the vicinity of the through hole 16. Although the supporting member 5 is electrically insulated from the exhaust pipe 4, there is a possibility that corona discharge will arise between the supporting member 5 and the through hole 16, if the vicinity of the through hole 16 rises to a high temperature. If corona discharge arises, then there will be a possibility that it will give rise to spark discharge. Cooling the vicinity of the through hole 16 by sending of air can keep the insulation between the supporting member 5 and the through hole 16.

Note that the surface electrode 6 has the ring frame 6a and the connecting frame 6b, whereby the structure thereof is reinforced. The exhaust pipe 4 with a rectangular sectional shape has the advantage that it is easy to manufacture, compared with the case of a circular sectional shape. The electric dust collector 3 is reinforced in structure because both ends of the supporting member 5 are supported. The discharge electrode 7 is electrically connected to the DC high-tension power supply 8 by the supporting member 5, and consequently, the constitution can be simplified compared with the case where the supporting member 5 consists of an insulating material. The insulators 21a and 21b supporting the supporting member 5 are provided at positions lower than the through holes 16, so the radiant heat from the interior of the exhaust pipe 4, which is radiated outside through the through holes 16, can prevent degradation of the insulators 21a and 21b. In addition, high-temperature gases can prevent the inverse flow of high-temperature exhaust gases by taking advantage of their characteristics showing inverse buoyancy with respect to a downward direction, and prevent the temperature rise of the insulators 21a and 21b and the adhesion of smoke dust to the insulators 21a and 21b.

Note in the aforementioned embodiment that the exhaust pipe 4 may have a circular sectional shape and that the interior surface of the steel pipe 14 in the form of a cylinder may be lined with the castable refractory material 15. In this case, the ring frame 6a has a circular contour and the mesh 6c has a conical surface shape. The mesh 6c covers the exterior of the cone downward from the ring frame 6a. The mesh 6c is arranged substantially coaxially with the exhaust pipe 4 so that it spreads within the exhaust pipe 4 toward the exit 4e with the vertex 6f down. The discharge electrode 7 protrudes downward from the vertex 6f of the mesh 6c in the form of a conical surface.

While, in the aforementioned embodiment, the mesh of the electrode has the side surface shape of a quadrangular pyramid, the mesh may have configurations such as those shown in FIGS. 5(A) through 7(Q). That is, in FIG. 5(A) the surface electrode is provided within the exhaust pipe 4 and has a hemispherical mesh 26a with the discharge electrode 7 as center. In FIG. 5(B) the surface electrode has a mesh 26b in the form combining a hemispherical surface and a cylindrical surface. In FIG. 5(C) the surface electrode has a mesh 26c in the form combining a hemispherical surface and a tapered cylindrical surface. In FIG. 5(D) the surface electrode has a mesh 26d in the form combining a conical surface and a cylindrical surface. In FIG. 5(E) the surface electrode has a mesh 26e in the form combining a conical surface and a tapered cylindrical surface. In FIG. 5(F) the surface electrode has a plurality of conical meshes 26f arranged in series. In FIG. 5(G) the surface electrode has a circular plate mesh 26g inclined with respect to the discharge electrode 7. In FIG. 5(H) the surface electrode has a plurality of circular plate meshes 26h inclined with respect to the discharge electrode 7 and arranged in series. In FIG. 5(I) the surface electrode has a plate mesh 26i obliquely extending in the form of a zigzag in the longitudinal direction of the discharge electrode 7.

Figure 6J:
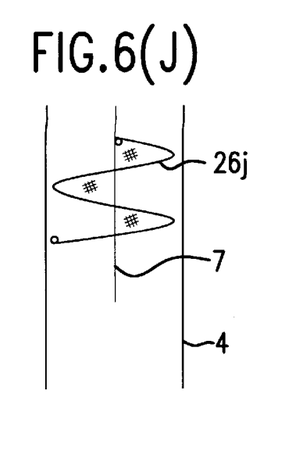
Figure 6K:
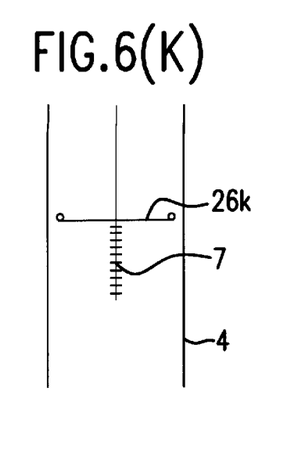
Figure 6L:
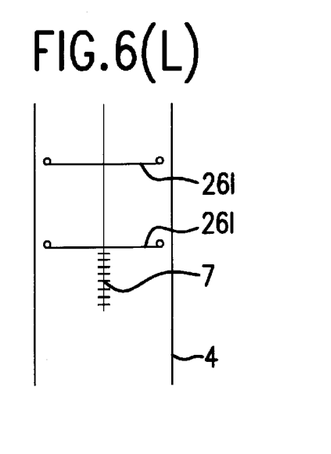
Figure 6M:
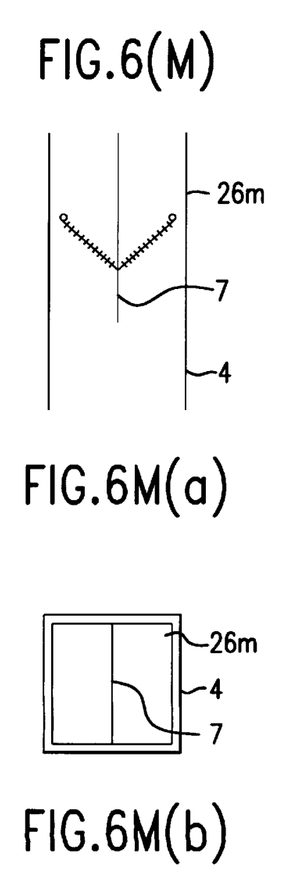
Figure 6N:
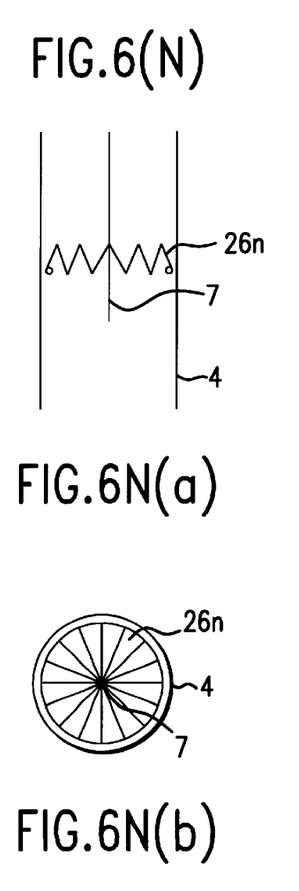
Figure 6O:
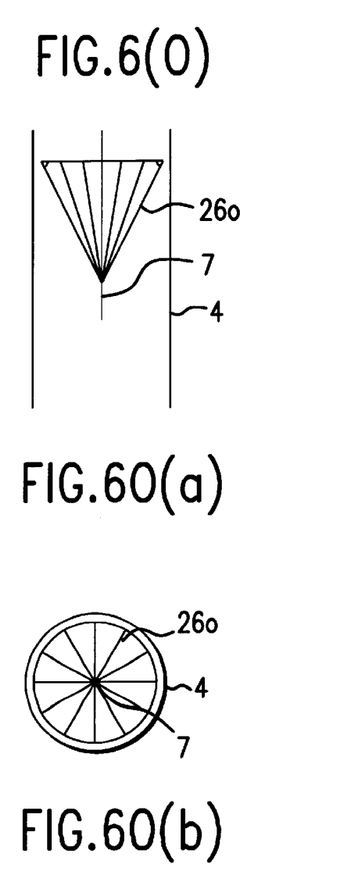

In FIG. 6(J) the surface electrode has a spiral mesh 26j around the discharge electrode 7. The end of the mesh 26j consists of a pipe. In FIG. 6(K) the surface electrode has a plate mesh 26k perpendicular to the discharge electrode 7. In FIG. 6(L) the surface electrode has a plurality of meshes 26l perpendicular to the discharge electrode 7. In FIG. 6(M) the surface electrode has a plate mesh 26m bent upward in two with the discharge electrode 7 as center, as shown in a sectional view of FIG. 6(M)(a) and a plan view of FIG. 6(M)(b). In FIG. 6(N) the surface electrode has a pleated plate mesh 26n perpendicular to the discharge electrode 7, as shown in a sectional view of FIG. 6(N)(a) and a plan view of FIG. 6(N)(b). In FIG. 6(O) the surface electrode has a pleated conical mesh 26o, as shown in a sectional view of FIG. 6(O)(a) and a plan view of FIG. 6(O)(b).

Figure 7P:
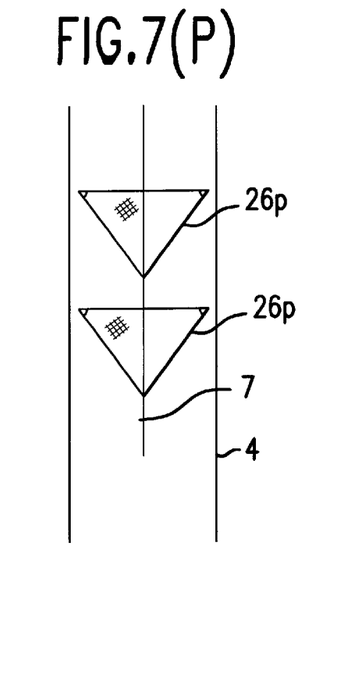
Figure 7Q:
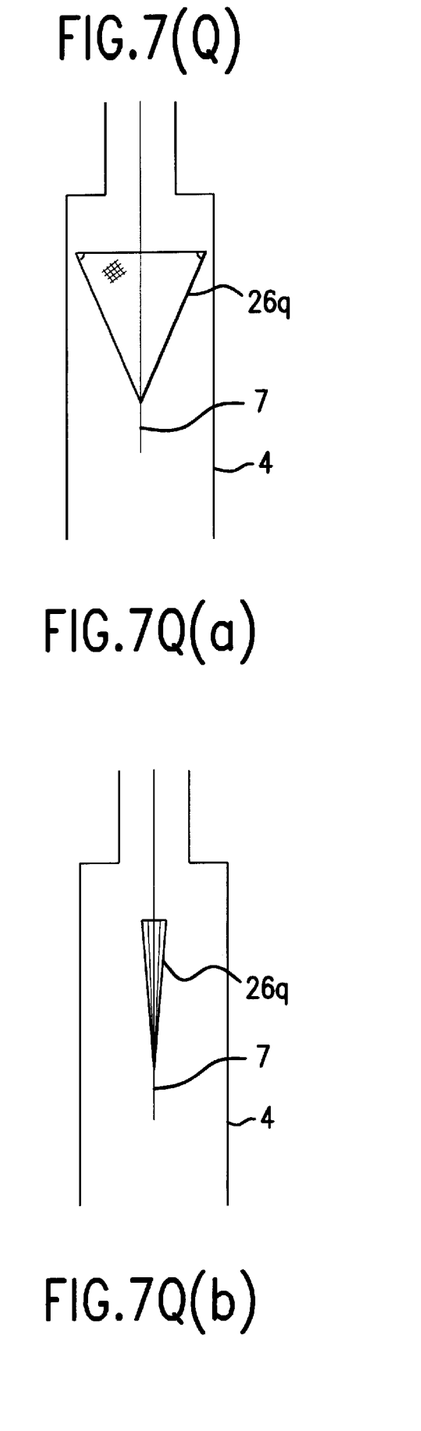
Figure 7R:
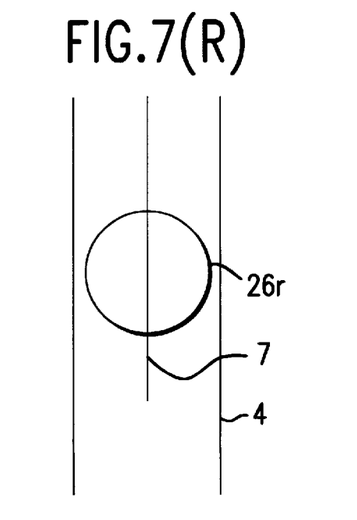

In FIG. 7(P) the surface electrode has a plurality of pleated conical mesh 26p. In FIG. 7(Q) the surface electrode has a parasol mesh 26q. As shown in FIG. 7(Q)(a), when the mesh is opened, it has a conical surface. As shown in FIG. 7(Q)(b), when the mesh is closed, the flange portion 27 can be lifted up with a wire 28 through the upper exit of the exhaust pipe 4 and easily taken out. In FIG. 7(R) the surface electrode has a spherical shell mesh 26r. Note that the upper half of the mesh 26r is dense, while the lower half is rough.

Figure 8:
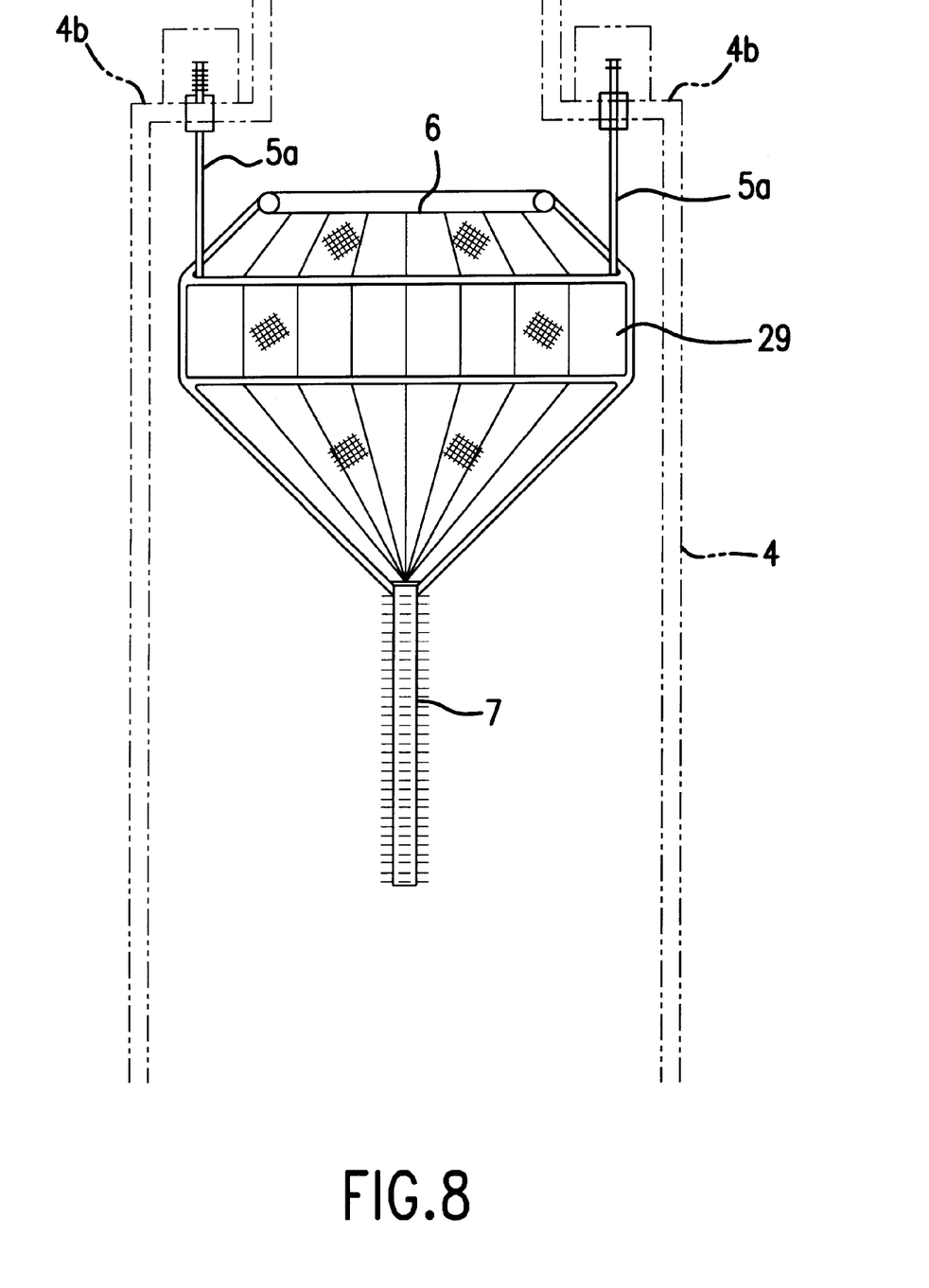
FIG. 8 is a side sectional view showing another embodiment of the surface electrode.

As illustrated in FIG. 8, the surface electrode 6 may have a mesh 29 in the form combining a truncated conical surface, a cylindrical surface, and an inverted conical surface. As illustrated in the figure, the surface electrode 6 may be hung within the exhaust pipe 4 from the bent portion 4b with the supporting members 5a. Note in FIGS. 7 and 8 that the surface electrode, in addition to a metal wire, may consist of a chain, line material concentrically wound at intervals of a predetermined pitch, line material spirally wound at intervals of a predetermined pitch, a punched metal, an expanded metal or the like.

Note in the aforementioned embodiment that an alkali spray nozzle may be provided in the combustion chamber of the incinerator along with a stabilizing burner. In this case, acid gases within the combustion chamber are neutralized with a dry process or a semi-dry process, whereby the occurrence of hydrogen chloride, $SO_x$, $NO_x$, dioxin and the like can be more perfectly prevented.

Note that the aforementioned disclosure relates to the subject matter contained in Japanese Patent Application No. 9-62281 filed on Feb. 27, 1997, the subject matter being also contained clearly in the present application by making reference to the Japanese patent application.

INDUSTRIAL APPLICABILITY

The electric dust collector according to the present invention is not only useful as an electric duct collector for an incinerator but also useful in the exhaust-gas disposal of metal refining-blast furnaces, metal heating and heat treatment furnaces, furnaces for ceramic industry, drying furnaces, melting furnaces, heat engines and the like, if they are devices for disposing high-temperature exhaust gases.

What is claimed is:

1. An electric dust collector comprising:
   an exhaust pipe with a metallic pipe whose interior surface is lined with refractory material;
   an electrode provided to spread within said exhaust pipe, said electrode having a plurality of air holes for disturbing passage of smoke dust wherein the electrode is charged with electricity to the same polarity as the dust;
   a supporting member supported outside said exhaust pipe, said electrode being electrically insulated from said exhaust pipe by said supporting member; and
   a high-tension power supply for applying high DC voltage between said electrode and said metallic pipe, said power supply being provided outside said exhaust pipe and also being electrically connected to said electrode.

2. The electric dust collector as set forth in claim 1 wherein said electrode comprises a discharge electrode and a surface electrode, said discharge electrode being arranged substantially coaxially with said exhaust pipe, and said surface electrode having said air holes, also being connected to said discharge electrode protruding downward, and spreading toward a wall surface of said exhaust pipe.

3. The electric dust collector as set forth in claim 2 wherein said surface electrode has a mesh, said mesh having said air holes and also being arranged to disturb a flow passage while keeping spacing between the wall surface of said exhaust pipe and an exterior circumference of said surface electrode.

4. The electric dust collector as set forth in claim 3 wherein
   said surface electrode has a ring frame and connecting frames, said ring frame having substantially the same contour as the sectional configuration of said exhaust pipe, also being connected to said discharge electrode by said connecting frames, and furthermore being arranged substantially coaxially with said exhaust pipe and equidistantly from said wall surface;
   said mesh makes contact with said ring frame; and
   said discharge electrode is supported by said supporting member.

5. The electric dust collector as set forth in claim 4 wherein
   said exhaust pipe has a circular sectional shape;
   said mesh has a conical shape spreading toward an exit of said exhaust pipe; and
   said discharge electrode protrudes downward from the vertex of said conical shape.

6. The electric dust collector as set forth in claim 4 wherein
   said exhaust pipe has a polygonal sectional shape;
   said mesh has a pyramid shape spreading toward an exit of said exhaust pipe; and
   said discharge electrode protrudes downward from the vertex of said pyramid shape.

7. The electric dust collector as set forth in claim 6 further comprising an air blower;
   wherein said exhaust pipe has a through hole;
   wherein said supporting member is electrically insulated from said exhaust pipe and inserted into said exhaust pipe through said through hole; and
   wherein said air blower is provided outside said exhaust pipe for sending air into said exhaust pipe through said through hole.

8. An incinerator comprising:
   the electric dust collector as set forth in claim 1, and
   a combustion chamber arranged just under said electric dust collector along the longitudinal direction of said exhaust pipe.

9. An electric dust collector comprising:
   an exhaust pipe with a metallic pipe whose interior surface is lined with refractory material;

an electrode provided to spread within said exhaust pipe, said electrode having a plurality of air holes for disturbing passage of smoke dust wherein the electrode is charged with electricity to the same polarity as the dust and for passing exhaust gases through the air holes without significantly disturbing exhaust gas passage, wherein disturbed dust is repelled from the electrode and collects on the exhaust pipe refractory material;

a supporting member supported outside said exhaust pipe, said electrode being electrically insulated from said exhaust pipe by said supporting member; and a high-tension power supply for applying high DC voltage between said electrode and said metallic pipe, said power supply being provided outside said exhaust pipe and also being electrically connected to said electrode.

10. The electric dust collector as set forth in claim 9 wherein said electrode comprises a discharge electrode and a surface electrode, said discharge electrode being arranged substantially coaxially with said exhaust pipe, and said surface electrode having said air holes, also being connected to said discharge electrode protruding downward, and spreading toward a wall surface of said exhaust pipe.

11. The electric dust collector as set forth in claim 10 wherein said surface electrode has a mesh, said mesh having said air holes and also being arranged to disturb a flow passage while keeping spacing between the wall surface of said exhaust pipe and an exterior circumference of said surface electrode.

12. The electric dust collector as set forth in claim 11 wherein said surface electrode has a ring frame and connecting frames, said ring frame having substantially the same contour as the sectional configuration of said exhaust pipe, also being connected to said discharge electrode by said connecting frames, and furthermore being arranged substantially coaxially with said exhaust pipe and equidistantly from said wall surface;

said mesh makes contact with said ring frame; and said discharge electrode is supported by said supporting member.

13. The electric dust collector as set forth in claim 12 wherein said exhaust pipe has a circular sectional shape;

said mesh has a conical shape spreading toward an exit of said exhaust pipe; and said discharge electrode protrudes downward from the vertex of said conical shape.

14. The electric dust collector as set forth in claim 12 wherein said exhaust pipe has a polygonal sectional shape;

said mesh has a pyramid shape spreading toward an exit of said exhaust pipe; and said discharge electrode protrudes downward from the vertex of said pyramid shape.

15. The electric dust collector as set forth in claim 14, further comprising an air blower;

wherein said exhaust pipe has a through hole;

wherein said supporting member is electrically insulated from said exhaust pipe and inserted into said exhaust pipe through said through hole; and wherein said air blower is provided outside said exhaust pipe for sending air into said exhaust pipe through said through hole.

16. An incinerator comprising:

the electric dust collector as set forth in claim 9, and a combustion chamber arranged just under said electric dust collector along the longitudinal direction of said exhaust pipe.

17. An electric dust collector comprising:

an exhaust pipe;

an electrode provided to spread within the exhaust pipe, the electrode having;

a mesh having air holes for allowing exhaust gases to pass therethrough substantially undisturbed, an electrical charge on the mesh, and a forward discharge electrode for imparting an electrical charge to the particles which is the same polarity as a charge on the mesh, wherein particles which have received a charge from the forward discharge electrode are guided away from the mesh and towards a wall of the exhaust pipe because the particles and the mesh have the same charge polarity; and a high-tension power supply for applying high voltage between said electrode and said exhaust pipe.

* * * * *